(12) United States Patent
Linzer

(10) Patent No.: US 9,508,156 B1
(45) Date of Patent: Nov. 29, 2016

(54) LEVEL-BASED MOTION DETECTION IN A SEQUENCE OF PICTURES

(71) Applicant: Ambarella, Inc., Santa Clara, CA (US)

(72) Inventor: Elliot N. Linzer, Bergenfield, NY (US)

(73) Assignee: Ambarella, Inc., Santa Clara, CA (US)

( * ) Notice: Subject to any disclaimer, the term of this patent is extended or adjusted under 35 U.S.C. 154(b) by 91 days.

(21) Appl. No.: 14/580,867

(22) Filed: Dec. 23, 2014

(51) Int. Cl.
*G06T 7/20* (2006.01)
*G06T 7/40* (2006.01)

(52) U.S. Cl.
CPC ............. G06T 7/2033 (2013.01); G06T 7/408 (2013.01); *G06T 2207/20182* (2013.01)

(58) Field of Classification Search
CPC ....... G06T 7/2033; G06T 7/408; G06T 7/20; G06T 7/204; G06T 2207/20182
USPC ......................................................... 382/107
See application file for complete search history.

(56) References Cited

U.S. PATENT DOCUMENTS

| 8,126,059 B2* | 2/2012 | Yagi ................ H04N 5/144 348/699 |
| 8,345,919 B2* | 1/2013 | Seo ................. G06T 7/2053 382/103 |
| 2007/0071342 A1* | 3/2007 | Bilbrey ............. G06T 5/50 382/254 |
| 2008/0106544 A1* | 5/2008 | Lee ................. G09G 3/3611 345/214 |
| 2011/0142290 A1* | 6/2011 | Aida ............... H04N 5/144 382/107 |

OTHER PUBLICATIONS

Yan et al. "Novel Adaptive Temporal Filter Based on Motion Compensation for Video Noise Reduction." International Symposium on Communications and Information Technologies, Sep. 20, 2006, pp. 1031-1034.*

* cited by examiner

*Primary Examiner* — Jon Chang
(74) *Attorney, Agent, or Firm* — Christopher P. Maiorana, PC

(57) ABSTRACT

A method for level-based motion detection in a sequence of pictures is disclosed. Step (A) of the method may compute one or more local tonal values in an area around a sample of a target picture in the sequence of pictures. Step (B) may compare the target picture and a reference picture in the sequence of pictures in the area to compute a motion score. Step (C) generally detects a motion of the sample based on the local tonal values, the motion score and one or more gain settings with a circuit.

19 Claims, 8 Drawing Sheets

LEVEL-BASED MOTION DETECTION IN A SEQUENCE OF PICTURES

FIELD OF THE INVENTION

The present invention relates to video motion detection generally and, more particularly, to level-based motion detection in a sequence of pictures.

BACKGROUND OF THE INVENTION

Conventional motion detection looks at a local error measure, commonly a sum-of-absolute-differences, between a target picture and a reference picture. Even if no motion exists, such local error measures tend to be non-zero due to noise and changes in scene lightness. Therefore, motion detection commonly detects small differences between the pictures as no motion and big differences as motion.

It would be desirable to implement level-based motion detection in a sequence of pictures.

SUMMARY OF THE INVENTION

The present invention concerns a method for level-based motion detection in a sequence of pictures. Step (A) of the method may compute one or more local tonal values in an area around a sample of a target picture in the sequence of pictures. Step (B) may compare the target picture and a reference picture in the sequence of pictures in the area to compute a motion score. Step (C) generally detects a motion of the sample based on the local tonal values, the motion score and one or more gain settings with a circuit.

The objects, features and advantages of the present invention include providing level-based motion detection in a sequence of pictures that may (i) account for a brightness in a local area of a target picture prior to motion detection, (ii) account for a color in the local area prior to the motion detection, (iii) adjust a motion score of the local area used in the motion detection to compensate for an expected amount of noise in the local area, (iv) detect motion based on the adjusted motion score and/or (v) temporal filter based on the adjusted motion score.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Motion detection may be used in many applications, such as security cameras and/or many operations, such as motion compensated temporal filtering (e.g., MCTF) a sequence of pictures (or images). For the motion compensated temporal filtering, a filter may adaptively combine one or more reference (or previous) pictures and a target (or current) picture of the sequence based on detected motion in the target picture relative to the reference pictures. The filtering may also decide locally how to combine the multiple pictures (e.g., fields and/or frames) to reduce noise while limiting filter-created artifacts.

Typically, the filter may use a reference picture in a stronger blend the more the filter determines that no motion exists in a local area relative to the reference picture. For such a filter, motion may mean motion in an absolute sense, if motion exists. In various embodiments, the reference pictures may be transformed per a motion model (e.g., a process used to estimate motion between the pictures). The transformed (motion compensated) reference pictures may be subsequently combined with the target picture. For a motion compensated temporal filtering case, motion generally means motion between the motion compensated reference pictures and the target picture. For a non-motion compensated temporal filtering case, motion generally means motion between the non-compensated reference pictures and the target picture.

Figure 1:
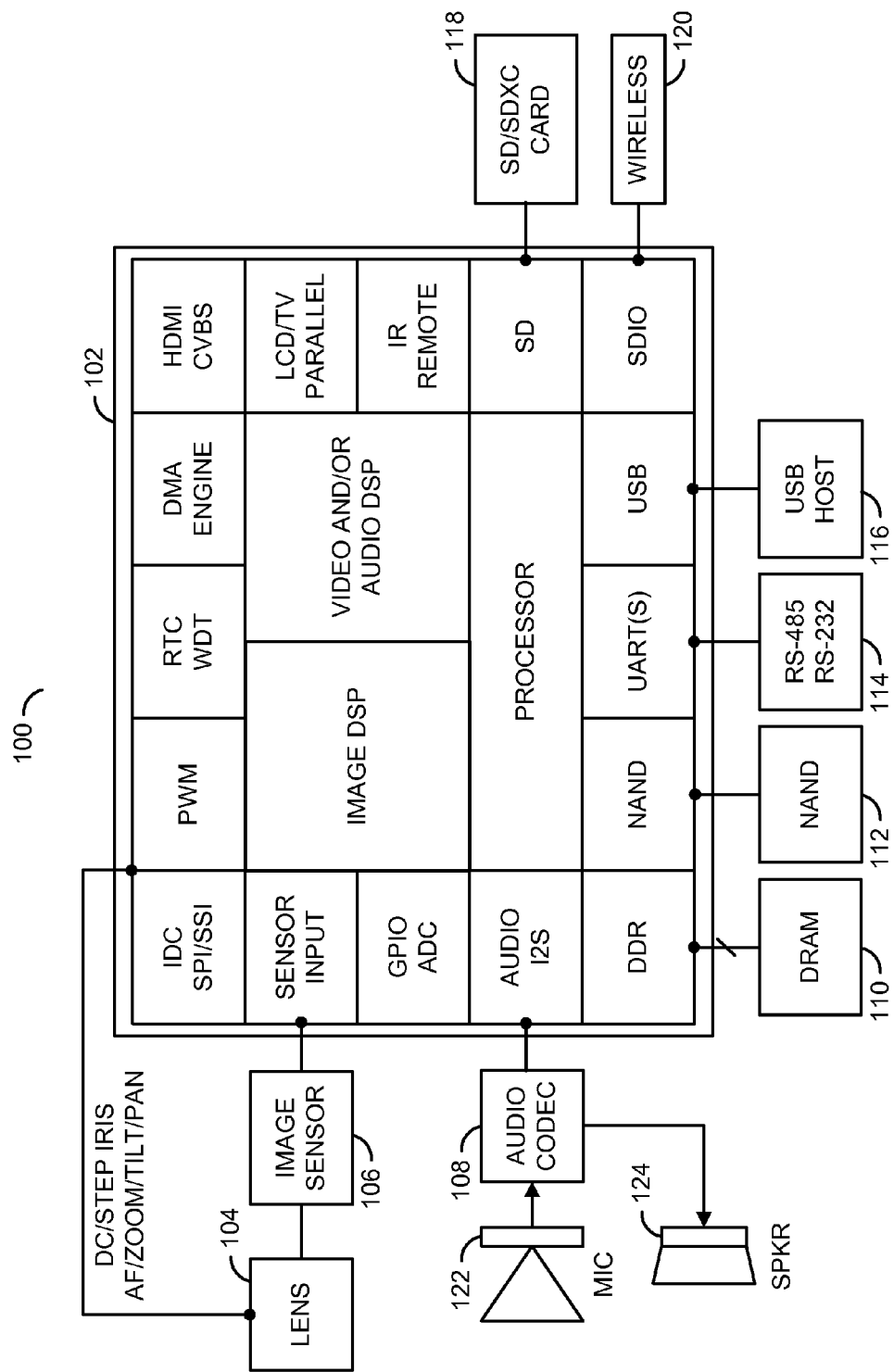
FIG. 1 is a block diagram of a camera system.

Referring to FIG. 1, a block diagram of a camera system 100 is shown illustrating an example implementation of a camera/recorder system (or apparatus). In some embodiments, the camera system 100 may be a digital video camera, a digital still camera or a hybrid digital video/still camera. In an example, the electronics of the camera system 100 may be implemented as one or more integrated circuits. For example, an application specific integrated circuit (e.g., ASIC) or system-on-a-chip (e.g., SOC) may be used to implement a processing portion of the camera system 100. In various embodiments, the camera system 100 may comprise a camera chip (or circuit) 102, a lens assembly 104, an image sensor 106, an audio codec 108, dynamic random access memory (e.g., DRAM) 110, non-volatile memory (e.g., NAND flash memory, etc.) 112, one or more serial interfaces 114, an interface 116 for connecting to or acting as a universal serial bus (e.g., USB) host, an interface for connecting to a removable media 118 (e.g., SD—secure digital media, SDXC—secure digital extended capacity media, etc.), a wireless interface 120 for communicating with a portable user device, a microphone 122 for recording audio, and a speaker 124 for playing audio. In some embodiments, the lens assembly 104 and the image sensor 106 may be part of a separate camera connected to the processing portion of the system 100 (e.g., via a video cable, a high definition media interface (e.g., HDMI) cable, a USB cable, an ethernet cable, or wireless link).

In various embodiments, the circuit 102 may comprise a number of modules (or circuits) including, but not limited to, a pulse width modulation (e.g., PWM) module, a real time clock and watchdog timer (RTC/WDT), a direct memory access (e.g., DMA) engine, a high-definition multimedia interface (e.g., HDMI), an LCD/TV/Parallel interface, a general purpose input/output (e.g., GPIO) and analog-to-digital converter (e.g., ADC) module, an infrared (e.g., IR) remote interface, a secure digital input output (e.g., SDIO) interface module, a secure digital (e.g., SD) card interface, an audio I²S interface, an image sensor input interface, and a synchronous data communications interface (e.g., IDC SPI/SSI). The circuit 102 may also include an embedded processor (e.g., ARM, etc.), an image digital signal processor (e.g., DSP), and a video and/or audio DSP. In embodiments incorporating the lens assembly 104 and image sensor 106 in the system 100, the circuit 102 may be configured (e.g., programmed) to control the lens assembly 104 and receive image data from the sensor 106. The wireless interface 120 may include support for wireless communication by one or more wireless protocols such as Bluetooth®, ZigBee®, Institute of Electrical and Electronics Engineering (e.g., IEEE) 802.11, IEEE 802.15, IEEE 802.15.1, IEEE 802.15.2, IEEE 802.15.3, IEEE 802.15.4, IEEE 802.15.5, and/or IEEE 802.20. The circuit 102 may also include support for communicating using one or more of the universal serial bus protocols (e.g., USB 1.0, 2.0, 3.0, etc.). The circuit 102 may also be configured to be powered via the USB connection. However, other communication and/or power interfaces may be implemented accordingly to meet the design criteria of a particular implementation.

In various embodiments, programming code (e.g., executable instructions for controlling various processors of the circuit 102) implementing a level-based motion detection and a motion compensated temporal filter in accordance with an embodiment of the invention may be stored in one or more of the memories 110 and 112. When executed by the circuit 102, the programming code generally causes the circuit 102 to receive a sequence of pictures from the sensor 106, compute one or more local tonal values in an area around a target sample of a target picture in the sequence, compare the area in the target picture and a corresponding reference area in a reference picture in the sequence to compute a score, and detect a motion of the target sample based on the local tonal values and the motion score.

The amount of noise in each area of each picture tends to vary based on a brightness of the respective area. In typical cases, dark color tones and/or dark lumination levels and bright color tones and/or bright lumination levels generally have lower noise than mid-color tones and/or mid-lumination levels. The color tones and/or lumination levels may be taken into account when detecting motion. Therefore, an area may be considered stationary or slow moving if a measured local difference between the area in the target picture and a co-located area in the reference picture is small compared with the expected local difference due to noise for the local color tone/lumination. For big differences compared with the expected local difference due to noise for the local color tone/lumination, the area may be considered in motion. Moderate differences compared with the expected local difference due to noise for the local color tone/lumination may be considered as intermediate (or medium) motion. For motion compensated temporal filtering, the three types of detections may translate into heavy filtering, medium filtering, or no filtering to weak filtering. The heavy filtering may be applied for small differences compared with the expected local difference due to noise for the local color tone/lumination. The medium filtering may be applied for medium differences compared with the expected local difference due to noise for the local color tone/lumination. The no filtering or weak filtering may be applied for large differences compared with the expected local difference due to noise for the local color tone/lumination.

Figure 2:
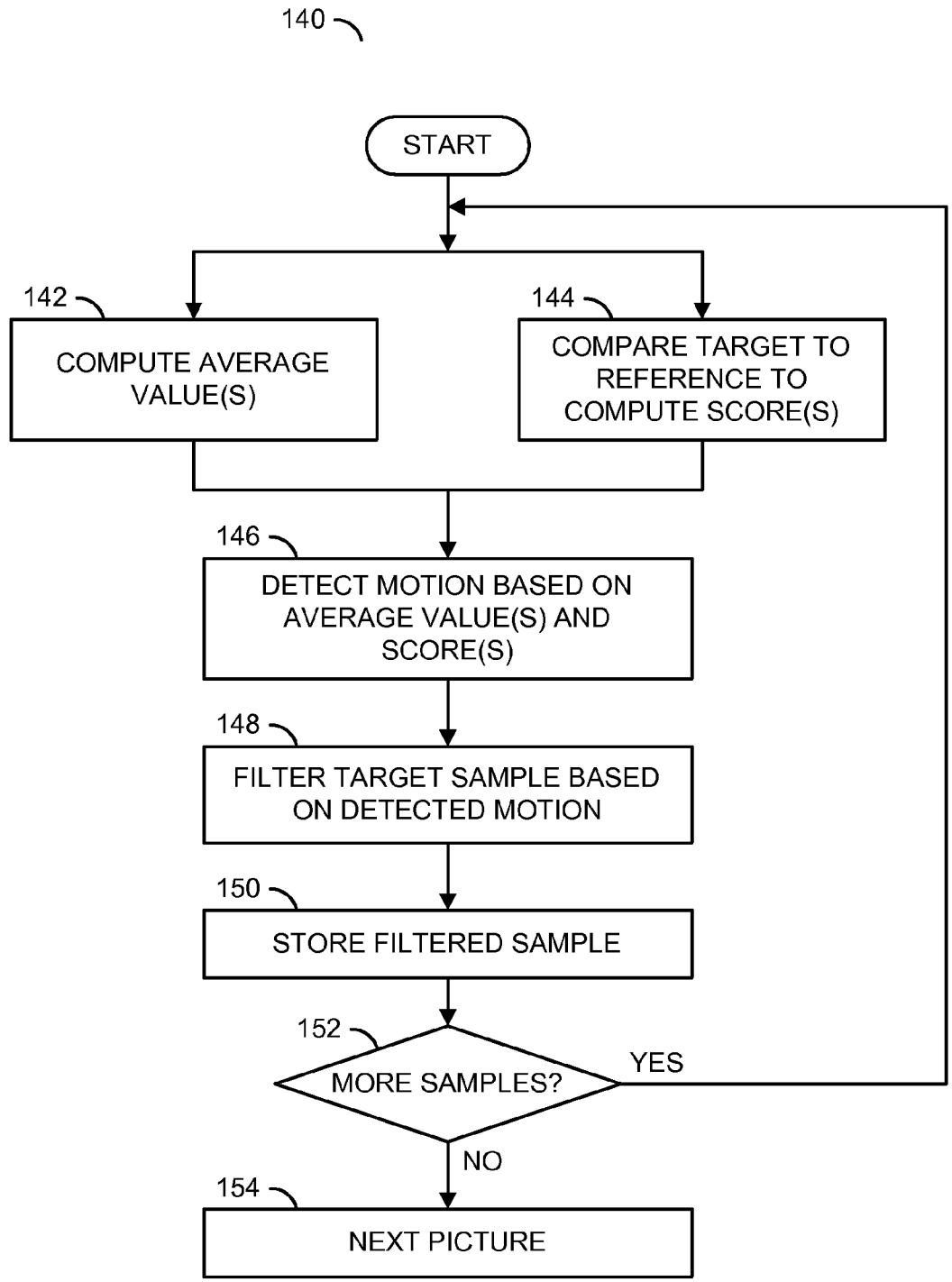
FIG. 2 is a flow diagram of a level-based motion detection method in accordance with a preferred embodiment of the present invention.

Referring to FIG. 2, a flow diagram of a level-based motion detection method 140 is shown in accordance with a preferred embodiment of the present invention. The method (or process) 140 may be performed by the circuit 102. The method 140 generally comprises a step (or state) 142, a step (or state) 144, a step (or state) 146, a step (or state) 148, a step (or state) 150, a step (or state) 152, and a step (or state) 154. The steps 142-154 may be implemented in hardware, software, firmware or any combination thereof in an apparatus (or circuit or device). The sequence of the steps is shown as a representative example. Other step orders may be implemented to meet the criteria of a particular application.

In some embodiments, the method 140 may start with the step 142 and the step 144 performed in parallel (or simultaneously), as shown. In other embodiments, the steps 142 and 144 may be performed sequentially. The step 142 may compute one or more local tonal values in an area (e.g., 3×3 area, 5×5 area, 7×7 area, 9×9 area, etc.) around a target sample in a target picture. Each target picture generally has multiple samples (or pixels) arranged in a two-dimensional array.

In some embodiments, the step 142 is configured to compute a single local tonal value (e.g., an average luminance value or average brightness value) in the area around the target sample. In other embodiments, the step 142 may be configured to compute a multidimensional (e.g., three-dimensional) value in the area around the target sample. For example, the tonal values may be a single average value for each of a luminance component and two chrominance components (e.g., YUV or YCC) of the pixels in the area. In another example, the tonal values may be a single value for each color component (e.g., RGB or color-saturation-hue) of the pixels in the area.

In various embodiments, the local tonal values may be average values, median values, or mode values. The local tonal values may include, but are not limited to, a luminance value of a sample, a local maximum of the luminance values, a three-dimensional lookup based on YUV pixels, a three-dimensional lookup based on RGB pixels, a three-dimensional lookup based on an average of each YUV component, and a three-dimensional lookup based on an average of each RGB pixel. Other local tonal values may be implemented to meet the criteria of a particular application.

The step 144 may compare the area around the target sample in the target picture to the same (co-located) areas in the reference pictures. In various embodiments, the comparisons may calculate one or more motion scores (or metrics) in the form of a sum-of-absolute-differences (e.g., SAD) values. In other embodiments, different types of calculations (e.g., sum-of-differences-squared) may be performed. The motion scores may be a single-dimensional metrics (e.g., a SAD of the luminance components) or multidimensional metrics (e.g., a SAD of the luminance and one or two SADs of the two chrominance components, or a SAD of each color component for the area.) In some embodiments, the comparisons may be performed between the target area in the target picture and a co-located reference areas in the original reference pictures. In other embodiments, the reference pictures and/or reference blocks may be motion compensated prior to the comparisons.

The motion compensation may be thought of as warping of a picture to match another picture. The motion compensation may be performed by several techniques:

Block based, use a different motion vector for each block of a picture; Model based, such as pan, zoom, or tilt of the entire picture; and No change.

The no change technique is generally appropriate for a fixed (e.g., not moving) camera, such as a mounted security camera. Significant portions of each picture taken by the stationary camera may be assumed to be stationary, even though the assumption is always wrong where motion is present in the scene.

Motion of the target sample may be detected in the step 146. In various embodiments, the motion detection may be a normal motion detection that uses motion scores that are not modified based on the color tone/luminance levels. In some embodiments, the motion detection may be based on the motion scores and the local tonal (e.g., the average) values. For example, the motion detection may compare a modified motion score, adjusted per the average levels, against a threshold. If the motion score is above the threshold, the target sample is detected as in motion. If the motion score is below the threshold, the target sample is detected as stationary.

In some embodiments, the motion detection may have three levels of detection: slow/no motion, intermediate (or medium) motion, and fast motion. Where the motion score is below a lower threshold, the target sample may be detected as stationary (e.g., no motion). Where the motion score is above an upper threshold, the target sample may be detected as moving (e.g., fast motion). For motion scores between the lower threshold and the upper threshold, the target sample may be considered to have the medium amount of motion.

In the step 148, the circuit 102 may use the detected motion (e.g., slow/no motion, medium or intermediate, and fast) to temporally filter the target sample. In various embodiments, the filtering may be a motion compensated temporal filtering. The motion compensated temporal filtering generally estimates a motion of the area around the target sample relative to one or more reference pictures to find one or more respective motion vectors. The motion vectors are subsequently used to motion compensate all or portions of the reference pictures to generate motion compensated reference areas corresponding to the target area. The motion compensated reference areas may have integer pixel positions, half-pixel positions, quarter-pixel positions and/or eighth-pixels positions. The motion compensated reference areas (or the motion compensated reference samples) may be blended with the target area (or the target sample) based on the motion scores and the local tonal values. The blending generally reduces noise in the target area/target sample. In other embodiments, the reference pictures may not be motion compensated prior to the local tonal value computations in the step 142 and/or the comparison to the target area in the step 144.

In the step 150, the filtered target sample may be stored in one or more of the memories (e.g., the memory 110). A check may be performed in the decision step 152 to determine if any more target samples exist in the current target picture. If more target samples have yet to be processed, the method 140 may move to the next unprocessed target sample and return to the start. Once all of the target samples in the current target picture have been processed, the method 140 may continue in the step 154 with the target samples in the next picture.

Figure 3:
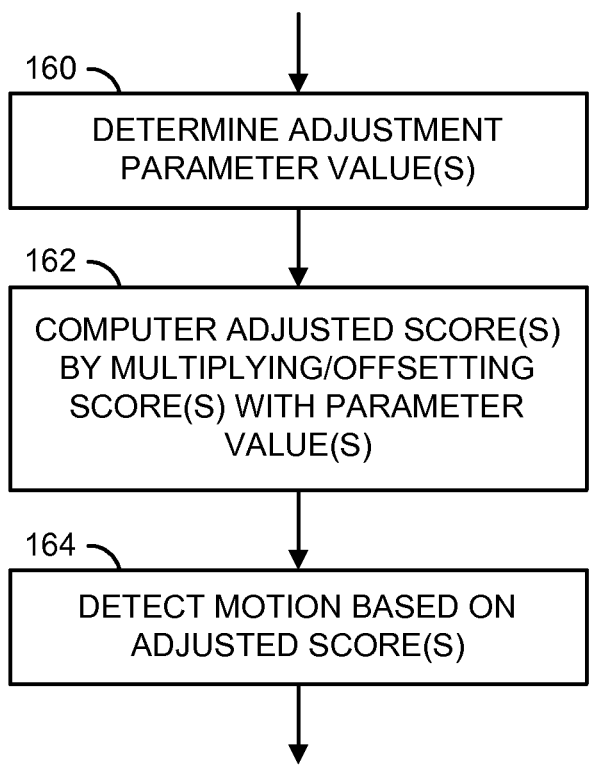
FIG. 3 is a detailed flow diagram for detecting motion.

Referring to FIG. 3, a detailed flow diagram of an example method for the step 146 for detecting motion is shown. The step 146 generally comprises a step (or state) 160, a step (or state) 162, and a step (or state) 164. The steps 160-164 may be performed by the circuit 102. The steps 160-164 may be implemented in hardware, software, firmware or any combination thereof in an apparatus (or circuit or device). The sequence of the steps is shown as a representative example. Other step orders may be implemented to meet the criteria of a particular application.

In the step 160, the local tonal values and one or more gains settings may be used to determine one or more parameter values for an adjustment. Generally, a parameter value may be determined for each dimension of the local tonal values. In some embodiments, the adjustment parameter values may be determined by a transformation of the local tonal values. In other embodiments, the adjustment parameter values may be determined by a lookup table indexed by the local tonal values. In still other embodiments, a mathematical equation may calculate the parameter values using the local tonal values as variables.

The gain settings may take into account an impact that gain changes may have on the tonal (e.g., average) values in the target picture. The gain setting may include an analog gain and/or a digital gain in the image sensor 106, and/or a digital gain in the circuit 102. Furthermore, offset settings, exposure settings and/or aperture settings may also be considered. The circuit 102 generally controls the lens assembly 104 and/or the image sensor 106 for an automatic expose operation. Changes in the automatic exposure may change the light levels in the image data received from the sensor 106. Therefore, the average values may be modified to account for the automatic exposure settings. For example, a high gain value alone, or high gain values with a wide aperture value, and a low average value generally indicates that the target picture is a low-light scene and, although dark, is usually noisy. Therefore, such high-gain, low-light, low average values may be adjusted and treated similar to noisier-type average values.

In the step 162, the circuit 102 may adjust the motion scores based on the adjustment parameter values. Each adjustment may be one or more multiplications and/or offsets of one or more of the motion scores. For example, a single adjusted motion score may be calculated from a single average luminance value. Maximum motion scores and median motion scores may also be implemented where multiple motion scores are calculated. By way of example, a single adjusted motion score may be calculated from a maximum red motion score, and a maximum green motion score, and a maximum blue motion score. In still another example, the single adjusted motion score may be calculated from average or maximum motion scores for each component in a YUV, YCC or any other color space. In other embodiments, multidimensional motion scores may result in multidimensional adjusted motion scores.

In various embodiments, the adjustment may be multiplication of the motion scores by the corresponding parameter values determined in the step 160. For example, in areas where the noise is expected to be low (e.g., dark areas, bright areas, yellow areas, white areas, black areas, etc.), the parameter value may be high so that the adjusted motion score is higher than normal. Therefore, motion scores in low-noise areas may be amplified and subsequently detected as fast motion or intermediate motion (e.g., above the low threshold). In areas where the noise is expected to be high (e.g., mid-range luminance values, blue values, etc.), the parameter values may be low so that the adjusted motion scores are not increased to the point of triggering a false fast motion detection (e.g., below the high threshold) or false intermediate motion detection (e.g., above the low threshold). In some embodiments, the adjustment parameter value may match or be greater than unity. In other embodiments, the adjustment parameter value may be less than unity to prevent the normal background noise from being detected as movement.

In various embodiments, an offset (e.g., an amount to add or subtract) may be used in place of the multiplier. Positive offsets may be added to the motion scores such that motion in the low noise area is detected (e.g., above the low threshold). Negative offsets may reduce the motion scores such that noise in the noisy areas is either detected as stationary or as intermediate motion.

Motion of the target sample may be detected in the step 164 based on the adjusted scores from the step 162. In various embodiments, the motion detection may be based on one or more threshold values. The single threshold approach may provide the stationary/motion decision. The two threshold approach may provide the slow/medium/fast decisions. Other numbers of fixed thresholds and/or variable thresholds may be implemented to meet the criteria of a particular application.

Figure 4:
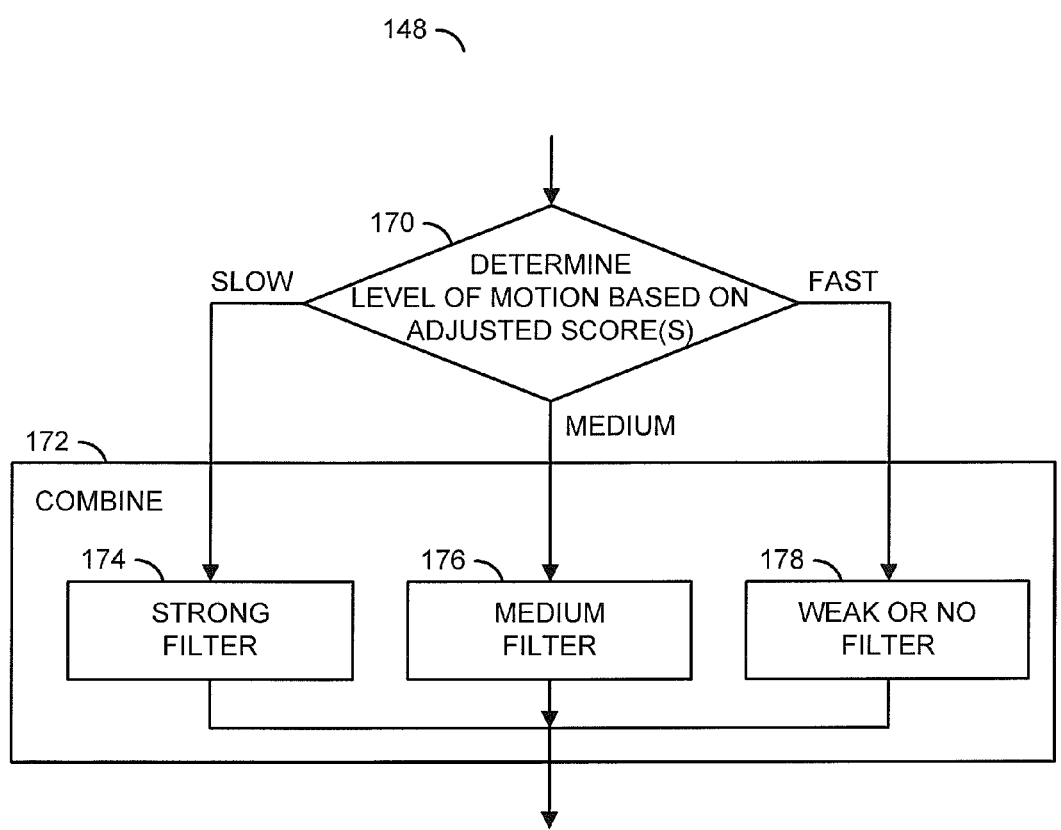
FIG. 4 is a detailed flow diagram for filtering a target sample.

Referring to FIG. 4, a detailed flow diagram of an example method for the step 148 of filtering the target sample is shown. The step 148 generally comprises a step (or state) 170 and a step (or state) 172 The step 172 generally comprises a step (or state) 174, a step (or state) 176, and a step (or state) 178. The steps 170-178 may be performed by the circuit 102. The steps 170-178 may be implemented in hardware, software, firmware or any combination thereof in an apparatus (or circuit or device). The sequence of the steps is shown as a representative example. Other step orders may be implemented to meet the criteria of a particular application.

In various embodiments, the circuit 102 may determine in the decision step 170 a level of motion based on the adjusted motion scores. The determination may be that little to no motion is present (e.g., slow), some motion may be present (e.g., medium or intermediate) or that rapid movement is detected (e.g., fast). Once the amount of motion has been determined, the target sample in the target area may be combined (or blended) in the step 172 with the co-located reference sample in the (optionally motion compensated) reference area.

Where little to no motion is detected, the target sample may be temporally filtered with a strong filter in the step 174. Where some motion is detected, the target sample may be temporally filtered with a medium filter in the step 176. For fast motion, the target sample is generally filtered by either a weak filter or no filtering is performed in the step 178 to avoid smearing the image.

Figure 5:
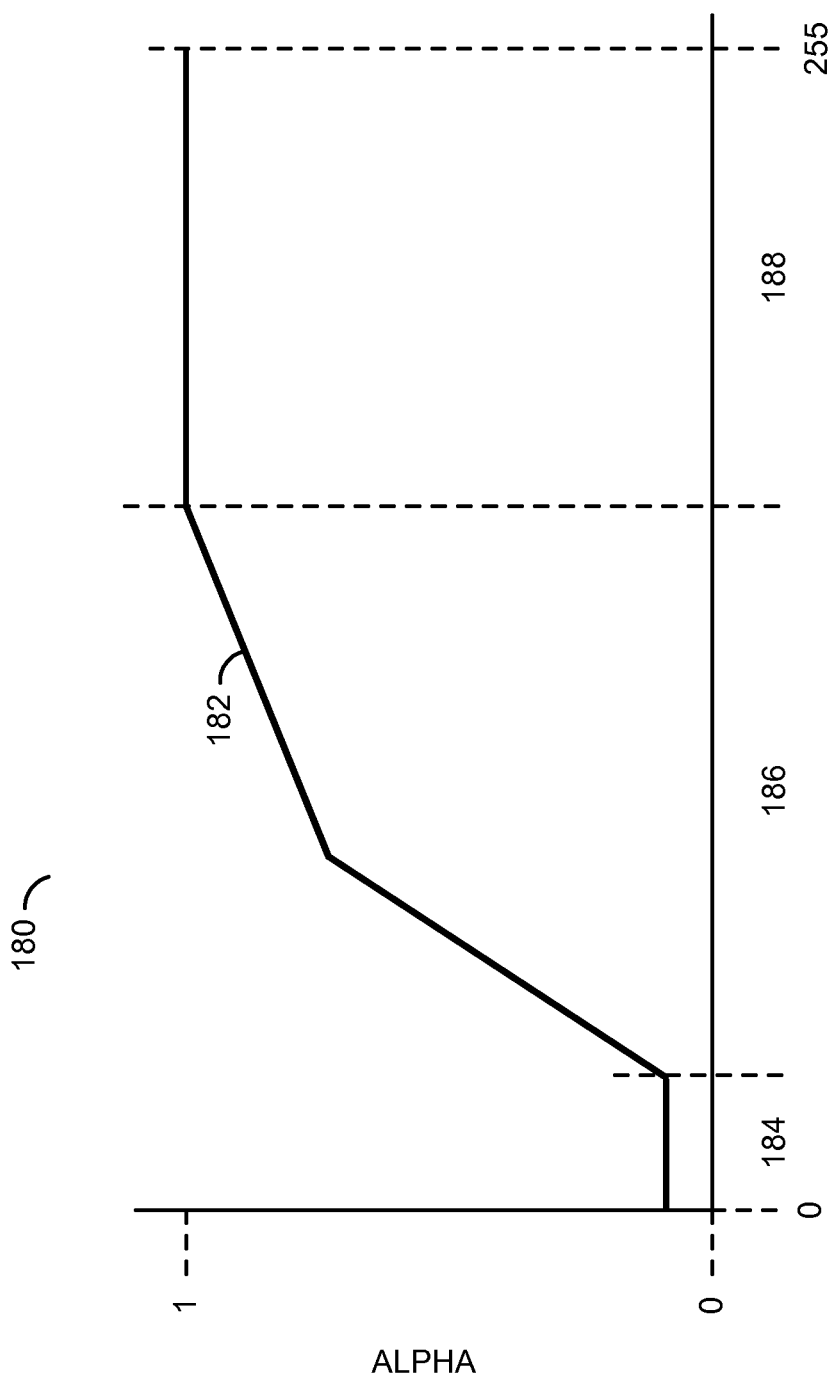
FIG. 5 is a diagram of a blending curve.

Referring to FIG. 5, a diagram 180 of an example blending curve 182 is shown. A strength of the temporal filtering (or blending) may be a continuum for one or more of the filter steps (e.g., the steps 174-178). The diagram 180 generally illustrates a range of medium filter strengths (e.g., the step 176) and fixed filter strengths (e.g., the steps 174 and 178). A degree of filtering may depend on the blending curve 182.

An example of blending is generally determined as follows:
T=target (current) sample;
R=reference (previous) sample;
D=level-based detected motion; and
Alpha (curve 182)=lookup of the value D.
A filtered result (sample) may be calculated by formula 1 as follows:

$$\text{Result} = (\text{Alpha} \times T) + ((1 - \text{Alpha}) \times R) \quad (1)$$

In the diagram 180, the X axis generally represents the detected motion value D. For 8-bit levels of detected motion, the X axis is generally labeled from 0 to 255. The Y axis generally represents the alpha value and range from 0 (zero) to 1 (unity). Other ranges of D and alpha may be implemented to meet the criteria of a particular application. Other techniques for determining the value D may also be implemented, such as considering several samples.

Small detected motion values D are illustrated in the section 184. The section 184 generally results in a low value of alpha per the blending curve 182. Medium (or intermediate) detected motion values D are illustrated in the section 186. The section 186 generally results in a range of values for alpha per the blending curve 182. Large detected motion values of D are illustrated in the section 188. The section 188 generally results in a high value of alpha per the blending curve 182.

Where slow or no motion is detected in the step 146, the value D is small and in the section 184. Therefore, the value alpha is small (and optionally a fixed value). Per formula 1, the small value alpha weights the blending to favor the reference sample, or in some cases (e.g., alpha=0.5) averages the reference sample with the target sample. Such blending may be considered the strong filtering (e.g., the filtering in the step 174). Where medium motion is detected, the value D is medium and in the section 186. Thus, the value alpha is medium. Per formula 1, the medium value alpha variably weights the blending between the target sample and the reference sample, depending on the level of motion. Such blending may be considered the medium filtering (e.g., the filtering in the step 176). Where fast motion is detected, the value D is large and in the section 188. Therefore, the value alpha may be large and weights the blending to favor the target sample. Such blending is generally considered the weak filtering (e.g., the filtering in the step 178). Where the value alpha=1, no filtering is accomplished and the target sample is unchanged.

Figure 6:
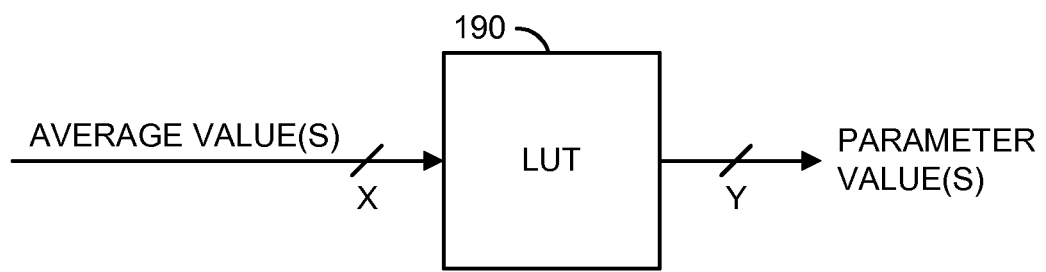
FIG. 6 is a diagram of a transformation by lookup table.

Referring to FIG. 6, a diagram of an example transformation by lookup table is shown. The transformation from the average values to one or more parameter values may be performed with one or more lookup tables (e.g., LUT). One or more (e.g., X) average values may be used to index an LUT circuit (or module) 190. For single-dimensional cases (e.g., X=1), the average value may be a luminance value or other indication of scene brightness. A single resulting parameter value (e.g., Y=1) may be read and presented from the LUT 190. For multidimensional cases (e.g., X=3), the average values (e.g., YUV, YCC, RGB, etc.) may index the LUT 190. The LUT 190 may read and present one (e.g., Y=1) or more (e.g., Y=2 or 3) parameter values based on the received index value. The number Y of parameter values is generally determined by a complexity of the filtering of the motion scores. In various embodiments where a simple filter is applied to all motion scores, a single parameter value may be utilized. Where the filtering is different for different channels (e.g., a luminance channel filter is lighter than the chrominance channel filters), multiple (e.g., Y=2 or 3) parameter values may be read from the LUT 190. Other combinations of average values and parameter values may be implemented to meet the criteria of a particular application.

Figure 7:
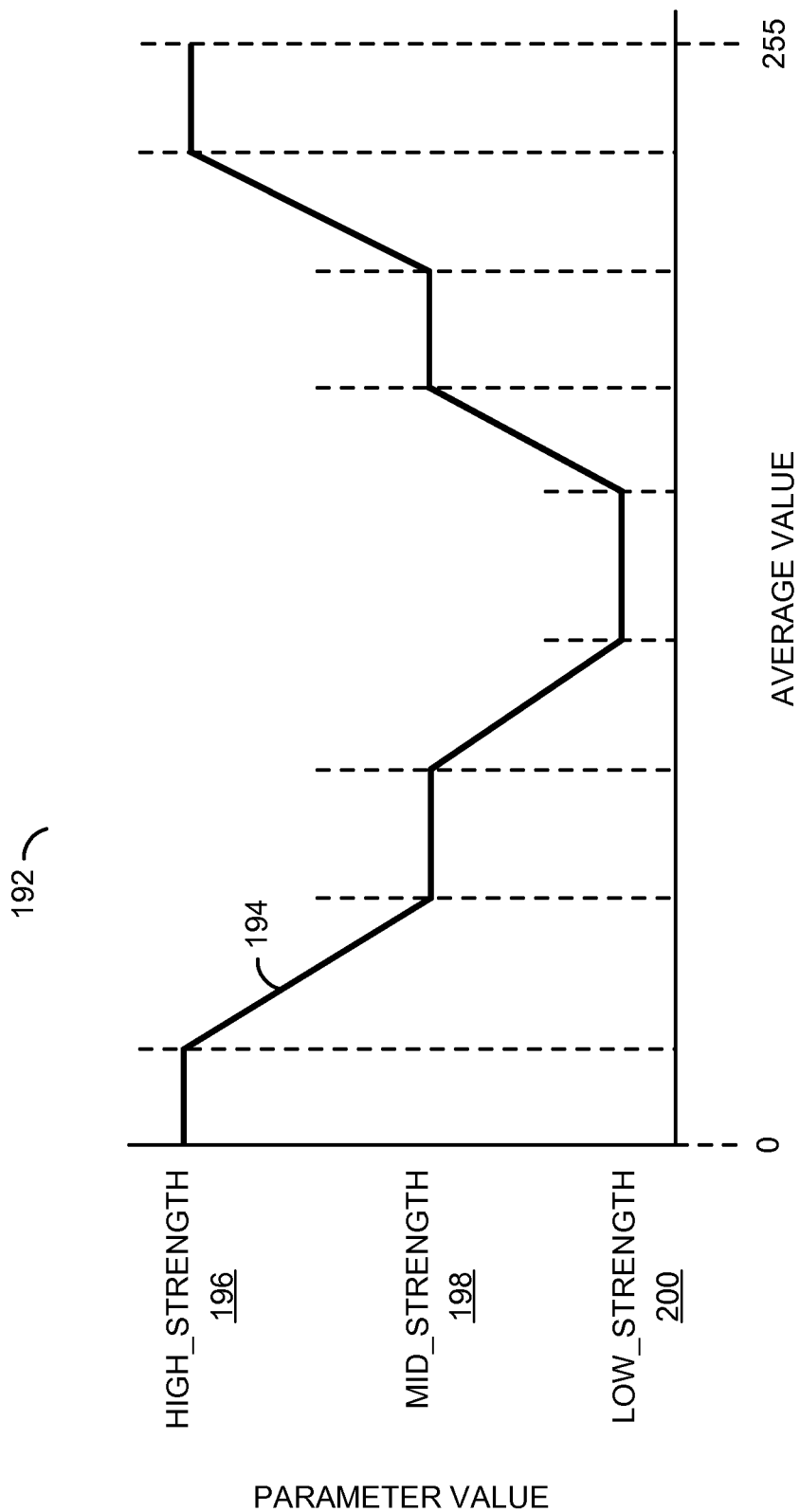
FIG. 7 is a diagram of a transformation curve in a single dimension.

Referring to FIG. 7, a diagram 192 of an example transformation curve 194 in a single dimension is shown. The transformation curve 194 generally comprises multiple connected segments. Multiple transformations may be implemented where multiple average values are transformed. Each segment may be either a horizontal non-sloped line (or linear) segment or a sloped line (or linear) segment. In various embodiments, one or more curved (e.g., nonlinear) segments may be implemented in the transformation curve 194.

For low-noise type average values (e.g., near zero values and near maximum values), the transformation curve 194 may present a high-strength value 196 for the parameter value. For high-noise type average values (e.g., near the center of the graph 192, the transformation curve 194 may present a low-strength value 200. Other average values may be presented by the transformation curve 194 as mid-strength values 198. In various embodiments, the high-strength value 196, the mid-strength value 198 and the low-strength value 200 may be established as predefined values in a software application program interface. Parameter values between the high-strength values 196 and the mid-strength values 198, and parameter values between the mid-strength values 198 and the low-strength values 200 may be represented in the transformation curve 194 as sloped lines or curves (e.g., either a positive slope or a negative slope). Other transformations may be implemented to meet the criteria of a particular application.

Figure 8:
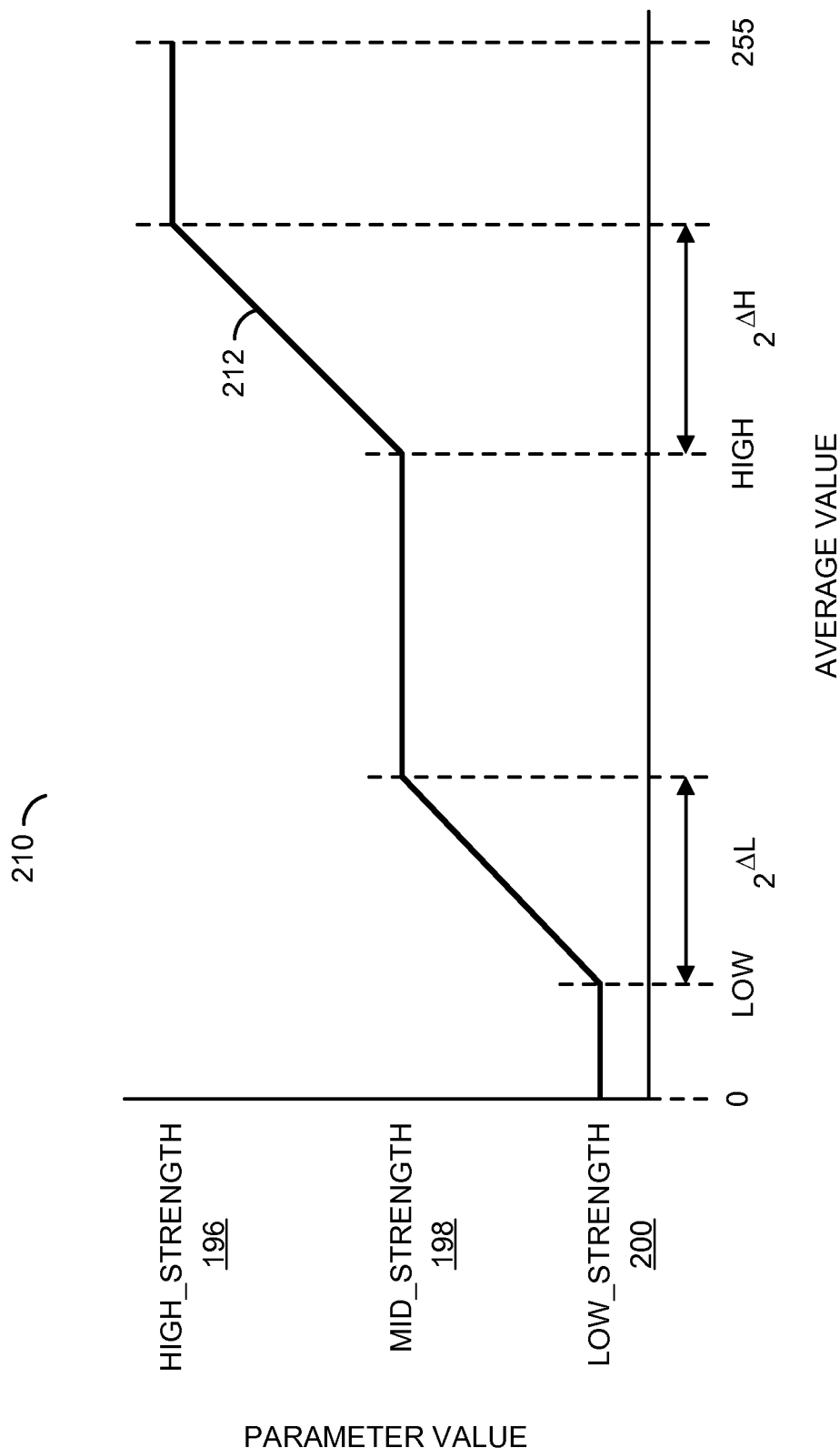
FIG. 8 is a diagram of another transformation curve in a single dimension.

Referring to FIG. 8, a diagram 210 of another example transformation curve 212 in a single dimension is shown. The transformation curve 212 generally comprises multiple connected segments. Multiple transformations may be implemented where multiple average values are transformed. Each segment may either be a horizontal line (or curve) or a sloped line (or curve).

In the example illustrated, average values between the origin (e.g., zero value) and a predetermined low value (e.g., LOW) may be transformed into the low-strength value 200. Moving to the right along the x-axis, several neighboring average values greater than the value LOW may be transformed into other parameter values up to the mid-strength value 198. In some embodiments, the segment of the transformation curve 212 between the low-strength value 200 and the mid-strength value 198 may span $2^{\Delta L}$ average values above the value LOW, where delta (Δ) L is either a fixed or adjustable value.

As the average value increases, the transformation curve 212 may remain the mid-strength value 198 until a high average value (e.g., HIGH) is reached. For average values greater than the value HIGH, the transformation curve 212 may increase the parameter value above the mid-strength value 198 until the high-strength value 196 is reached. In some embodiments, the segment of the transformation curve 212 between the mid-strength value 198 and the high-strength value 196 may span $2^{\Delta H}$ average values above the value HIGH, where delta (Δ) H is either a fixed or adjustable value. The remaining average values (e.g., above HIGH+ $2^{\Delta H}$) may be transformed into the high-strength value 196. Each transformation curve 194 and/or 212 may be created as a table (e.g., the LUT 190) or as a mathematical computation. In some embodiments, the sloped segments of the transformation curve 212 may cover ranges in powers of two to simplify the calculations. Other numbers of segments, parameter strength values and curves may be implemented to meet the criteria of a particular application.

The use of level-based motion detection between the target area and a motion compensated area generally allows the apparatus 100/method 140 to reduce noise and/or artifacts. Consider an example where the reference area has been motion compensated prior to computing the motion scores. If the average level in the target area indicates that a high level of noise may be present, the noise may appear as false motion (differences) between the target area and the motion compensated reference area. The level-based motion detection generally adjusts the motion score in the high-noise scenario toward lower (slower) levels (e.g., the low-strength value 200). The lower adjusted motion score generally results in stronger temporal filtering that may help reduce the high level of the noise. If the average level in the target area indicates that a low level of noise may be present, any detected differences may be due to actual motion still present between the target area and the motion compensated reference area. Therefore, the level-based motion detection generally adjusts the motion score in the low-noise scenario toward higher (faster) levels (e.g., the high-strength value 196). The higher adjusted motion score generally results in weaker temporal filtering that may produce weaker artifacts.

The functions and structures illustrated in the diagrams of FIGS. 1-8 may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for level-based motion detection in a sequence of pictures, comprising the steps of:
   computing one or more local tonal values in an area around a sample of a target picture in said sequence of pictures independent of all other pictures in said sequence of pictures, wherein said area is less than all of said target picture;
   comparing said target picture and a reference picture in said sequence of pictures in said area to compute a motion score in parallel to said computation of said one or more local tonal values; and
   detecting a motion of said sample based on said local tonal values, said motion score and one or more gain settings with a circuit.

2. The method according to claim 1, wherein said local tonal values in said area are at least one of (i) an average brightness value of a plurality of brightness values in said area and (ii) multiple average color values of a plurality of color values in said area.

3. The method according to claim 1, further comprising the step of:
   temporal filtering said sample, wherein a selected strength among at least three strengths of said temporal filtering is determined by said detected motion.

4. The method according to claim 1, further comprising the steps of:
   adjusting said motion score based on said local tonal values, wherein said detection of said motion of said sample is based on said adjusted motion score.

5. The method according to claim 4, wherein said adjustment of said motion score comprises a transformation of said local tonal values to obtain a parameter value.

6. The method according to claim 5, wherein said adjustment of said motion score further comprises a multiplication of said motion score by said parameter value to compute said adjusted motion score.

7. The method according to claim 5, wherein said adjustment of said motion score further comprises an offset of said motion score by said parameter value to compute said adjusted motion score.

8. The method according to claim 5, wherein said parameter value is a multidimensional value.

9. The method according to claim 5, wherein said transformation comprises a lookup of said parameter value in a lookup table indexed by said local tonal values.

10. An apparatus comprising:
   a circuit configured to receive a sequence of pictures; and
   a processor configured to (i) compute one or more local tonal values in an area around a sample of a target picture in said sequence of pictures independent of all other pictures in said sequence of pictures, wherein said area is less than all of said target picture, (ii) compare said target picture and a reference picture in said sequence of pictures in said area to compute a motion score in parallel to said computation of said one or more local tonal values and (iii) detect a motion of said sample based on said local tonal values, said motion score and one or more gain settings.

11. The apparatus according to claim 10, wherein said local tonal values in said area are at least one of (i) an average brightness value of a plurality of brightness values in said area and (ii) multiple average color values of a plurality of color values in said area.

12. The apparatus according to claim 10, wherein (i) said processor is further configured to temporal filter said sample and (ii) a selected strength among at least three strengths of said temporal filter is determined by said detected motion.

13. The apparatus according to claim 10, wherein (i) said processor is further configured to adjust said motion score based on said local tonal values and (ii) said detection of said motion of said sample is based on said adjusted motion score.

14. The apparatus according to claim 13, wherein said adjustment of said motion score comprises a transformation of said local tonal values to obtain a parameter value.

15. The apparatus according to claim 14, wherein said adjustment of said motion score further comprises a multiplication of said motion score by said parameter value to compute said adjusted motion score.

16. The apparatus according to claim 14, wherein said adjustment of said motion score further comprises an offset of said motion score by said parameter value to compute said adjusted motion score.

17. The apparatus according to claim 14, wherein said parameter value is a multidimensional value.

18. The apparatus according to claim 14, wherein said transformation comprises a lookup of said parameter value in a lookup table indexed by said local tonal values.

19. An apparatus comprising:
   means for computing one or more local tonal values in an area around a sample of a target picture in a sequence of pictures independent of all other pictures in said sequence of pictures, wherein said area is less than all of said target picture;
   means for comparing said target picture and a reference picture in said sequence of pictures in said area to compute a motion score in parallel to said computation of said one or more local tonal values; and
   means for detecting a motion of said sample based on said local tonal values, said motion score and one or more gain settings.

* * * * *